(12) United States Patent
Heffron

(10) Patent No.: US 12,379,837 B1
(45) Date of Patent: Aug. 5, 2025

(54) SYSTEM AND METHOD FOR FINANCIAL HEALTH VISUALIZATION

(71) Applicant: Wells Fargo Bank, N.A., San Francisco, CA (US)

(72) Inventor: Matthew J. Heffron, Bishop, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 195 days.

(21) Appl. No.: 18/050,758

(22) Filed: Oct. 28, 2022

(51) Int. Cl.
 *G06F 3/04847* (2022.01)
 *G06F 3/04817* (2022.01)
 *G06Q 40/06* (2012.01)
 *G06T 11/20* (2006.01)

(52) U.S. Cl.
 CPC ...... *G06F 3/04847* (2013.01); *G06F 3/04817* (2013.01); *G06Q 40/06* (2013.01); *G06T 11/206* (2013.01); *G06T 2200/24* (2013.01)

(58) Field of Classification Search
 CPC ................. G06F 3/048; G06F 3/04847; G06F 3/04817; G06Q 40/06; G06T 11/206; G06T 2200/24
 See application file for complete search history.

(56) References Cited

U.S. PATENT DOCUMENTS

| 7,788,146 | B2 | 8/2010 | Mccarthy, Jr. | |
|---|---|---|---|---|
| 8,473,858 | B2 | 6/2013 | Buchanan et al. | |
| 8,639,622 | B1 * | 1/2014 | Moore | G06Q 20/00 705/42 |
| 8,751,356 | B1 | 6/2014 | Garcia | |
| 10,510,082 | B1 | 12/2019 | Zimmerman et al. | |

(Continued)

FOREIGN PATENT DOCUMENTS

| CN | 112734516 | 4/2021 |
|---|---|---|
| CN | 112767144 | 5/2021 |

(Continued)

OTHER PUBLICATIONS

Emery, Ann. When to Use Horizontal Bar Charts vs Vertical Column Charts. Jan. 31, 2017. DepictDataStudio. <https://depictdatastudio.com/when-to-use-horizontal-bar-charts-vs-vertical-column-charts/> (Year: 2017).*

(Continued)

*Primary Examiner* — Liang Y Li
(74) *Attorney, Agent, or Firm* — SCHWEGMAN LUNDBERG & WOESSNER, P.A.

(57) ABSTRACT

Various examples are directed to computer-implemented systems and methods for financial health visualization. A method includes providing an interactive interface for a user on a graphical user interface (GUI) of a local user device, where providing the interactive interface includes using an instance of a program that is prevented from accessing networks once running to ensure security of user input. Input is received from the user generated by user manipulation of a plurality of sliders on the interactive interface. In response to the input, a plurality of financial measures indicative of a financial health of the user are calculated based on the input, and the plurality of financial measures are displayed on the interactive interface. Further in response to the input, a plurality of vertical stacked line graphs are adjusted based on the input, and the adjusted plurality of vertical stacked line graphs are displayed on the interactive interface.

24 Claims, 5 Drawing Sheets

(56) References Cited

U.S. PATENT DOCUMENTS

| | | | |
|---|---|---|---|
| 10,692,138 B1* | 6/2020 | Nguyen | H04L 63/102 |
| 11,023,977 B1 | 6/2021 | Khurana et al. | |
| 11,144,989 B1 | 10/2021 | Bardouille et al. | |
| 11,328,359 B1* | 5/2022 | Dahm | G06F 3/0482 |
| 2009/0183072 A1* | 7/2009 | Stephenson | G06F 3/0481 |
| | | | 715/708 |
| 2009/0276368 A1 | 11/2009 | Martin et al. | |
| 2013/0103580 A1* | 4/2013 | Ventura | G06Q 40/12 |
| | | | 705/40 |
| 2013/0318007 A1* | 11/2013 | Van Harlow | G06Q 10/10 |
| | | | 705/36 R |
| 2014/0058976 A1* | 2/2014 | Goodrich | G06Q 40/06 |
| | | | 705/36 R |
| 2014/0156480 A1 | 6/2014 | Qaim-maqami et al. | |
| 2014/0365355 A1 | 12/2014 | Shvarts | |
| 2016/0234212 A1* | 8/2016 | Huang | H04L 63/20 |
| 2018/0164992 A1* | 6/2018 | Prajapati | G06F 3/04847 |
| 2019/0278443 A1 | 9/2019 | Mashayekhi et al. | |
| 2022/0164886 A1* | 5/2022 | Fernandez Stuyck | |
| | | | G06Q 40/00 |

FOREIGN PATENT DOCUMENTS

| | | | | |
|---|---|---|---|---|
| KR | 101306658 B1 * | 11/2013 | | G06F 21/30 |
| WO | 2019107577 | 6/2019 | | |

OTHER PUBLICATIONS

Pawel. "Offline mode in mobile apps". Mar. 28, 2022. merixstudio.com. <https://web.archive.org/web/20220329130409/https://www.merixstudio.com/blog/offline-mode-mobile-apps> (Year: 2022).*

Cooper, Ben. "Is there a way to force a PWA to stay in offline mode via a toggle in-app?" Stakoverflow.com. <https://stackoverflow.com/questions/61865712/is-there-a-way-to-force-a-pwa-to-stay-in-offline-mode-via-a-toggle-in-app> (Year: 2020).*

Mihelcic, Alberto, "Advanced Financial Modeling Best Practices: Hacks for Intelligent, Error-Free Modeling", [Online]. Retrieved from the Internet: URL: https: www.toptal.com finance financial-modeling financial-modeling-best-practices, (Accessed on Jun. 3, 2022), 2 pgs.

* cited by examiner

SYSTEM AND METHOD FOR FINANCIAL HEALTH VISUALIZATION

TECHNICAL FIELD

Embodiments described herein generally relate to computer systems and methods, for example and without limitation, to systems and methods for a financial health visualization.

BACKGROUND

A user of computer systems may desire to examine their financial situation and determine the effects of various actions on their financial health. The user may also want to keep private their personal financial data used for such a financial health inquiry.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

A user of computer systems may desire to examine their financial situation and determine the effects of various actions on their financial health. The user may also want to keep private their personal financial data used for such a financial health inquiry.

The present subject matter provides a system and method for financial health visualization. The present system and method provides a safe, standalone tool for building a snapshot of a user's current financial picture with the ability to explore 'what-if' scenarios easily to assess the impact of selected changes on various aspects of the user's financial health.

Figure 1:
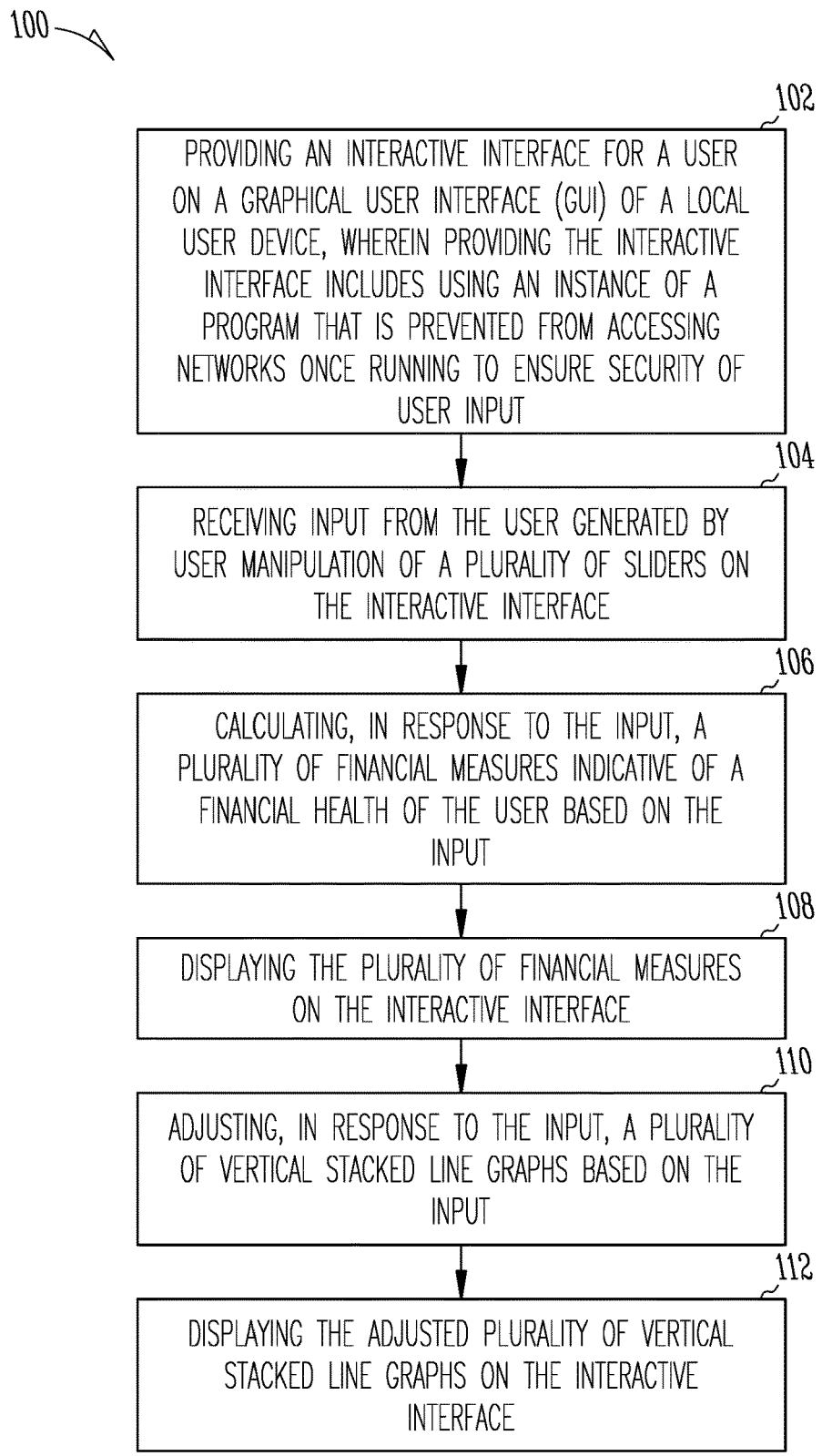
FIG. 1 illustrates an example embodiment of a method for providing a financial health visualization system, according to various embodiments.

FIG. 1 illustrates an example embodiment of a method for providing a financial health visualization system, according to various embodiments. The method 100 includes providing, by a processor of a computer, an interactive interface for a user on a graphical user interface (GUI) of a local user device, wherein providing the interactive interface includes using an instance of a program that is prevented from accessing networks once running to ensure security of the user input, at operation 102. In various examples, providing the interactive interface includes a specialized interface on a GUI of a local user device. The local user device may include any device in use by the user, including but not limited to, a laptop computer, a personal computer, a tablet, or a smart phone. At operation 104, the processor receives input from the user generated by user manipulation of a plurality of sliders on the interactive interface. In various examples, use of the sliders can increase or decrease a value associated with the user's financial situation. At operation 106, the processor calculates, in response to the input, a plurality of financial measures indicative of a financial health of the user based on the input. In various examples, the financial measures may include net worth, target net worth, liquidity, surplus income, target emergency fund, or the like. At operation 108, the processor displays the plurality of financial measures on the interactive interface. In various examples, a numerical value is provided with each of the plurality of financial measures based on the calculation. At operation 110, the processor adjusts, in response to the input, a plurality of vertical stacked line graphs based on the input. The plurality of vertical stacked line graphs may include an income and expenses vertical stacked line graph and an assets and liabilities vertical stacked line graph, in various examples. At operation 112, the processor displays the adjusted plurality of vertical stacked line graphs on the interactive interface. In some examples, each of the plurality of adjusted vertical stacked line graphs may include a break-even line.

Figure 2:
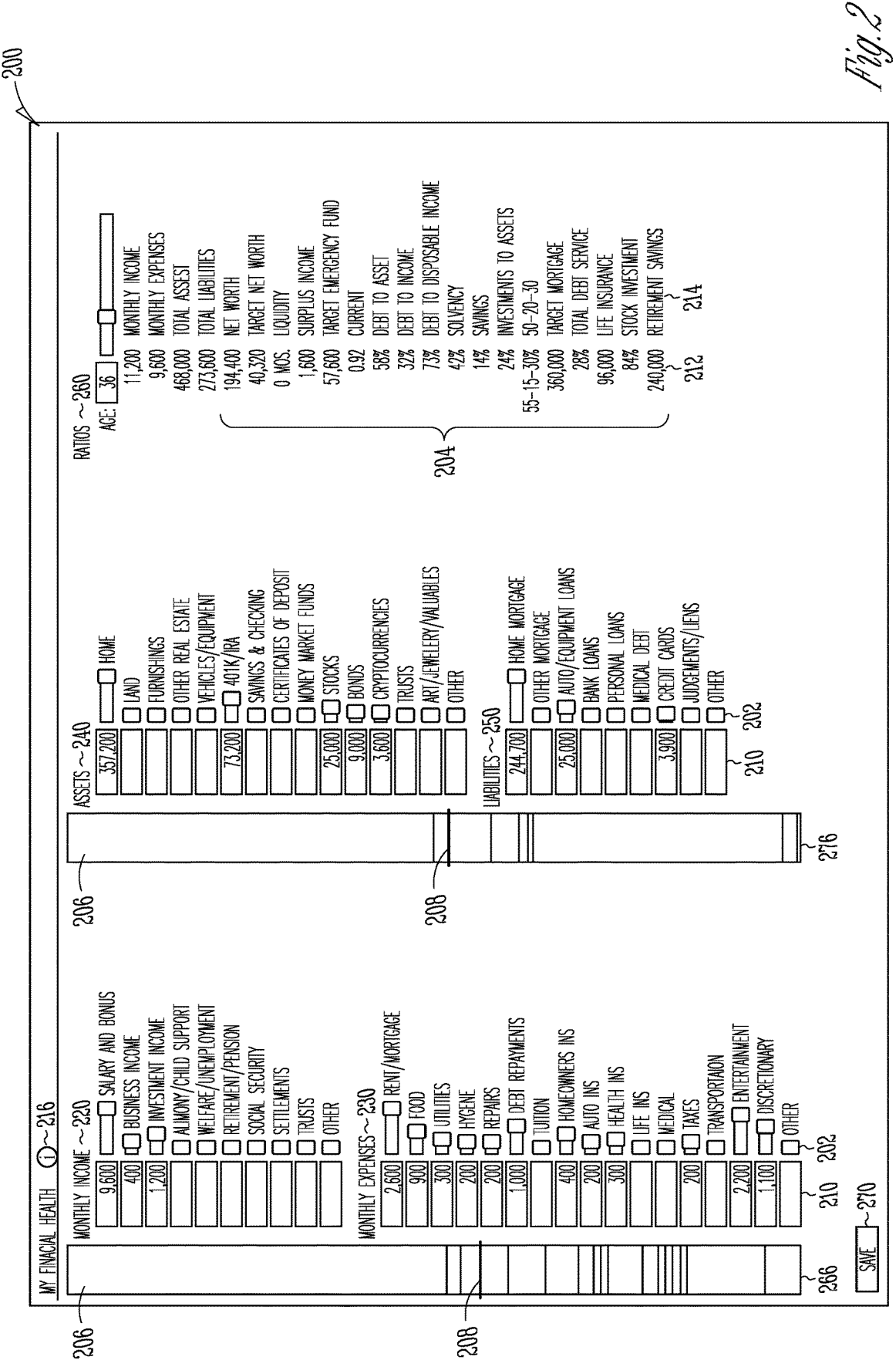
FIG. 2 illustrates a graphical diagram showing an example screenshot of a financial health visualization system, according to various embodiments.

FIG. 2 illustrates a graphical diagram showing an example screenshot of a financial health visualization system, according to various embodiments. An interactive interface 200 for a user is provided on a graphical user interface (GUI) of a local user device. The input is received from the user generated by user manipulation of a plurality of sliders 202 on the interactive interface. In response to the input, a plurality of financial measures 204 indicative of a financial health of the user are calculated based on the input, and the plurality of financial measures 204 are displayed on the interactive interface 200. In response to the input, a plurality of vertical stacked line graphs 206 are adjusted based on the input, and the adjusted plurality of vertical stacked line graphs 206 are displayed on the interactive interface. In some examples, one or more of the plurality of adjusted vertical stacked line graphs may include a break-even line 208. In one example, each of the plurality of adjusted vertical stacked line graphs may include a break-even line 208. The break-even line 208 may show where monthly income equals monthly expenses, in an example. In another example, the break-even line 208 may show where a user's assets equal a user's liabilities.

According to various embodiments, the processor may receive additional input from the user generated by text entry into a plurality of boxes 210 on the interactive interface, wherein each of the plurality of boxes corresponds to respective ones of the plurality of sliders. In some examples, the additional input from the user generated by text entry into the plurality of boxes 210 may override the input from the user generated by user manipulation of the plurality of sliders 202 on the interactive interface. In some examples, the input from the user generated by user manipulation of the plurality of sliders 202 may override the additional input from the user generated by text entry into the plurality of boxes 210 on the interactive interface. According to various embodiments, each of the plurality of financial measures may include a title portion 214 and a numerical portion 212. In some embodiments, in response to the user hovering a pointer over the title portion 214, the processor may be configured to display a text box describing how each of the plurality of financial measures is calculated.

In various embodiments, the processor may provide a heading icon 216 on the interactive interface. In response to the user hovering a pointer over the heading icon 216, the processor may display a text box describing how to use the interactive interface. The plurality of financial measures 204 may include two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level, in various embodiments.

According to various examples, the interactive interface 200 may include a monthly income 220 section, a monthly expenses 230 section, an assets 240 section, a liabilities 250 section, and a financial measures (or ratios) 260 section. The plurality of vertical stacked line graphs 206 may include an income and expenses 266 vertical stacked line graph and an assets and liabilities 276 vertical stacked line graph, in various examples.

In various embodiments, a user hovers over the information icon 216 using a pointer or mouse for instructions on using the interactive interface 200. A user moves the sliders 202 to change values or override the values in the boxes 210, in various embodiments. A user's input is graphically presented for assets/liabilities and income/costs to show the user's financial health against a plurality common financial measures, in various embodiments. The financial measures enable a user to see how they stack up against others with respect to their assets and investments. In one embodiment, eighteen financial measure or ratios are used. A user may hover over titles of a type of financial measures or ratios to see a breakdown of how each measure is calculated, in various examples. For example, when a user hovers over the 50-20-30 budget ratio, a pop up box explains to the user that one financial recommendation includes directing 50 percent of a user's income to a user's needs, 20 percent to savings or to pay debt, 30 percent to a user's wants or discretionary spending, and the measure is calculated from a user's total income after tax divided by needs, savings and wants. In one example, a break-even line 208 is shown for both vertical stacked line graphs 206.

According to various embodiments, the present application runs entirely locally in-browser with no server interaction such that user confidentiality is ensured. In various embodiments, a save function or button 270 may be activated by the user to store a copy of the worksheet locally on the user device, such as in a downloads folder.

The present subject matter provides many benefits. The present system is accessible for all users or customers, not just privileged or targeted customers. The interactive interface provided by the present subject matter shows a user a complete financial picture all in one place, visually, without the need for additional screens. A financial institution may provide this present system to customers as an educational tool, to assist the customer or user in determining how a change in one financial aspect affects other financial aspects or situations of the user.

In various embodiments, the present standalone system is secure and low risk. The present system is run completely local to a user's device or machine, and does not share information with any other user or system. In addition, the present system is compact, with only one file that a user obtains with code embedded in the one file to run the interactive interface. In various embodiments, the present interface is implemented using JavaScript or HTML (hypertext markup language). Other coding software may be used without departing from the scope of the present subject matter.

The present system increases user confidentiality, as it is completely local and does not interface with other machines. In various embodiments, if a user's device is accessed remotely and the interface is viewed, the numbers input by the user are not viewable by the remote access. The user does not access their accounts, so no one sees the information but the user. The present system works offline, with no connection or dependence on external data, in various embodiments. In some embodiments, if a user makes changes but does not use the save button, the depicted data goes back to the original values when the screen is refreshed, providing for version control for the user. If a user activates the save feature or button, a copy is saved in the user's download folder in an embodiment. In various embodiments, the file will not allow overwriting, so that a user would have to save the file in a different file name, providing additional browser security and confidentiality. Thus, the present system is highly visible and provides an instantaneous, real time financial picture with feedback, is easily adjustable, comprises a single file, and provides confidentiality in that others cannot see the users input it unless the user saves and sends them the file.

The present system provides a safe, standalone tool for building a snapshot of a user's financial picture with the ability to explore 'what-if' scenarios easily to assess the impact of different financial options or choices. In some embodiments, the present system may be integrated with additional 'rule-of-thumb' and 'best practice' algorithms to enhance advisory capabilities. The supplied data may be used to make concrete and actionable suggestions for specifically where the user's financial picture might be weakest, and how it could be improved, in various embodiments. For example, the present system may provide an advisory tool to make suggestions for how a user can improve their financial situation. In various examples, the advisory tool may provide a dialog box stating "considering your income, your rent is higher than most" or "I don't see any insurance" as feedback to the user. Use of a slider provided by the present system increases the ability of the user to find a "sweet spot" for a given value without repeated data entry, in various embodiments. The present system assists the user in lowering their expenses, in various embodiments. In various embodiment, the present system prevents bias of promoting self-serving investment approaches. For example, the present system may honestly and open-mindedly consider the risk and rewards of investments such as cryptocurrencies.

In various embodiments, the present system may provide for input of a user's financial priorities-such as 'early retirement', 'college funding', 'maximizing net worth', 'inflation hedge', and the like. In some embodiments, the present system may refer the user to advisory services and suggest both financial products and financial strategies to further the user's goals, from a personal perspective driven solely by the data, entirely offline and untracked, thus providing a safely anonymous financial health visualization option without unsolicited sales contacts. In one embodiment the present interface may provide a slider or box for a user to input whether the user is married or not. In one embodiment the present interface may provide a slider or box for a user to input a number of children of the user. In various embodiments, the present system calculates liquidity of a user using short term assets divided by monthly expenses, doing calculations in the background. In some examples, the present system may provide a slider or box for a user's savings and checking account balances.

Various embodiments of the present subject matter include a system for providing financial health visualization. The system includes a computing device comprising a processor and a data storage device in communication with the processor. The data storage device includes instructions thereon that, when executed by the processor, causes the processor to provide an interactive interface for a user on a graphical user interface (GUI) of a local user device, where providing the interactive interface includes using an instance of a program that is prevented from accessing networks once running to ensure security of the user input. In various examples, providing the interactive interface includes using a self-contained standalone computer program that does not interact with computer networks to ensure security of the user input. The input is received from the user generated by user manipulation of a plurality of sliders on the interactive interface. In response to the input, a plurality of financial measures indicative of a financial health of the user are calculated based on the input, and the plurality of financial measures are displayed on the interactive interface. In response to the input, a plurality of vertical stacked line graphs are adjusted based on the input, and the adjusted plurality of vertical stacked line graphs are displayed on the interactive interface, wherein at least one of the plurality of vertical stacked line graphs includes a break-even line.

In various examples, the local user device includes one or more of a laptop computer, a personal computer, a tablet, or a smart phone. The plurality of vertical stacked line graphs includes an income and expenses vertical stacked line graph and an assets and liabilities vertical stacked line graph, in various examples. The plurality of financial measures includes two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level, in various embodiments.

According to various embodiments, the data storage device comprises instructions thereon that, when executed by the processor, further causes the processor to receive additional input from the user generated by text entry into a plurality of boxes on the interactive interface, wherein each of the plurality of boxes corresponds to respective ones of the plurality of sliders. The additional input from the user generated by text entry into the plurality of boxes overrides the input from the user generated by user manipulation of the plurality of sliders on the interactive interface, in an embodiment. In another embodiment, the input from the user generated by user manipulation of the plurality of sliders overrides the additional input from the user generated by text entry into the plurality of boxes on the interactive interface.

In various embodiments, a non-transitory computer-readable storage medium is provided. The computer-readable storage medium includes instructions that when executed by computers, cause the computers to perform operations of providing an interactive interface for a user on a graphical user interface (GUI) of a local user device, wherein providing the interactive interface includes using an instance of a program that is prevented from accessing networks once running to ensure security of user input. Further operations include receiving input from the user generated by user manipulation of a plurality of sliders on the interactive interface, and calculating, in response to the input, a plurality of financial measures indicative of a financial health of the user based on the input. Additional operations include displaying the plurality of financial measures on the interactive interface, adjusting, in response to the input, a plurality of vertical stacked line graphs based on the input, and displaying the adjusted plurality of vertical stacked line graphs on the interactive interface, wherein at least one of the plurality of vertical stacked line graphs includes a break-even line.

According to various examples, each of the plurality of financial measures includes a title portion and a numerical portion, and in response to the user hovering a pointer over the title portion, the computers are configured to display a text box describing how each of the plurality of financial measures is calculated. A heading icon is provided on the interactive interface, and in response to the user hovering a pointer over the heading icon, a text box may be displayed describing how to use the interactive interface, in an example. In various examples, the interactive interface includes a monthly income section, a monthly expenses section, an assets section, a liabilities section, and a financial measures section.

Figure 3:
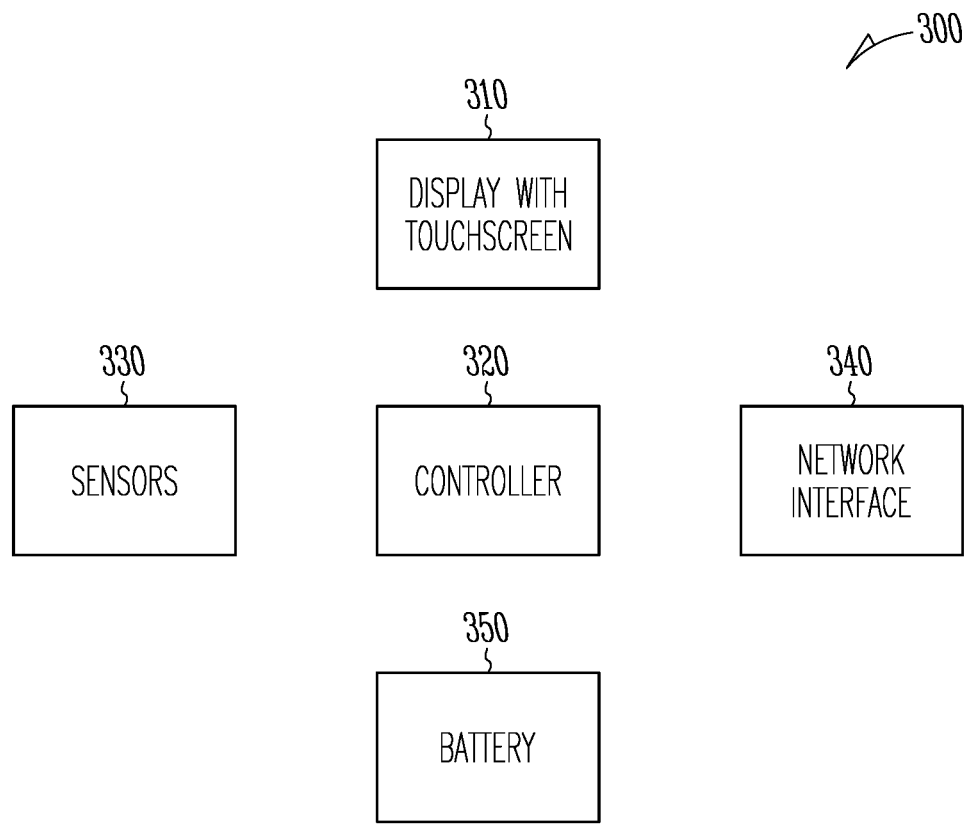
FIG. 3 illustrates an example embodiment of a computing device used by a user.

FIG. 3 illustrates an embodiment of computing device 300 used by a user. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments. The computing device 300 may be a personal computer or a mobile computing device such as smartphone, tablet computer, or other portable computing device. Exemplary mobile devices include the Apple iPhone and Samsung Galaxy smartphone. FIG. 3 is merely a non-limiting example of a computing device and many other devices may be used to facilitate the functionality described herein.

The network interface 340 may include an interface to a network such as Internet, LAN, Wi-Fi, home network, cellular network, NFC, and other types of networks, in various embodiments. The network interface 340 may include an interface to a local network. Exemplary local networks are a Local area network (LAN) and a Personal Area Network (PAN). The local network may use Bluetooth, Near Field Communication (NFC), Wi-Fi, ZigBee, or other wireless technology, in various embodiments. While the device includes a network interface, the data used for the present system is not obtained via the interface nor shared through the interface.

Figure 4:
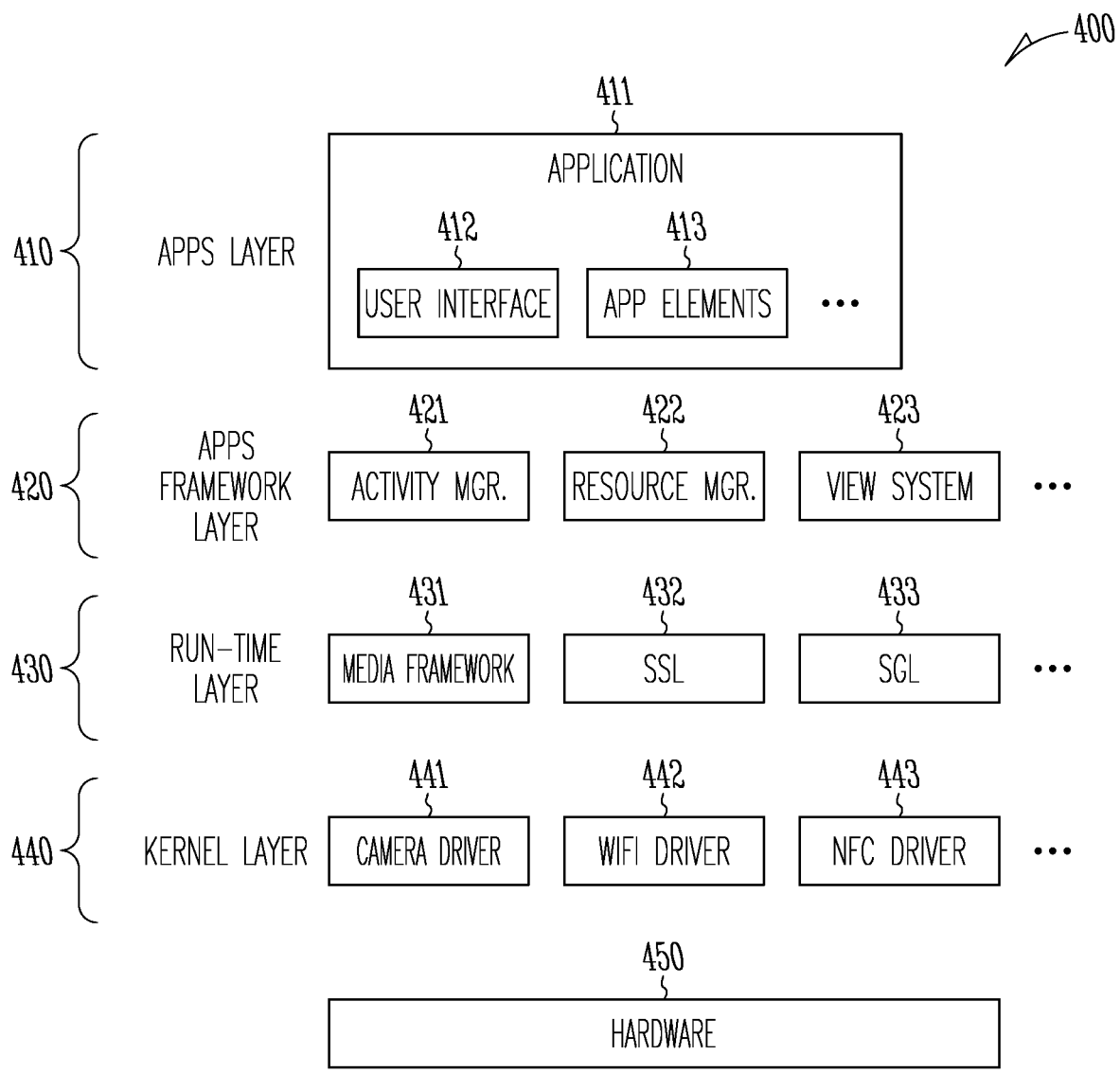
FIG. 4 illustrates an example embodiment of a computing device used for a financial health visualization system.

FIG. 4 illustrates an embodiment of a computing device 400 with a software application 411. In various embodiments, the computing device 400 includes personal computer or a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures may be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software may be conceptualized as a stack of layers where each layer provides particular functionality. For example, the software may include layers such as an operating system, libraries, frameworks/middleware, applications and presentation layer. Other software architectures may include additional or different layers. The operating system may manage hardware resources and provide common services. The overall system may include, for example, a kernel layer 440, run-time layer 430, application framework layer 420 and application layer 410. The kernel layer 440 may act as an abstraction layer between the hardware and the other software layers. For example, the kernel layer 440 may be responsible for memory management, processor management (e.g., scheduling), component management, networking, security settings, and so on. The drivers may be responsible for controlling or interfacing with the underlying hardware. For instance, the drivers may include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 may include a media framework 431, a secure sockets layer (SSL) 432 and a secure group layer (SGL) 433, in various embodiments. The application framework layer 420 may include an activity manager 421, a resource manager 422, and a view system application 423, in various embodiments. The application layer 410 may include built-in applications and/or third-party applications. Examples of representative built-in applications may include, but are not limited to, a contacts application, a browser application, a book reader application, a location application, a media application, a messaging application, and/or a game application. Third-party applications may include any of the built-in applications as well as a broad assortment of other applications. In a specific example, the third-party application (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application may invoke application programming interface (API) calls provided by the operating system to facilitate functionality described herein. A software application 411 may implement the functionality of a pseudonymous browsing mode, in one embodiment. The pseudonymous browsing mode may be provided by a built-in or third-party application, which may include a user interface 412 and application elements 413 in various embodiments.

The applications in application layer 410 may utilize built in operating system functions (e.g., kernel, services and/or drivers), libraries, frameworks and middleware to create user interfaces to interact with users of the system. Alternatively, or additionally, in some systems interactions with a user may occur through a presentation layer. In these systems, the application/module "logic" may be separated from the aspects of the application/module that interact with a user.

Figure 5:
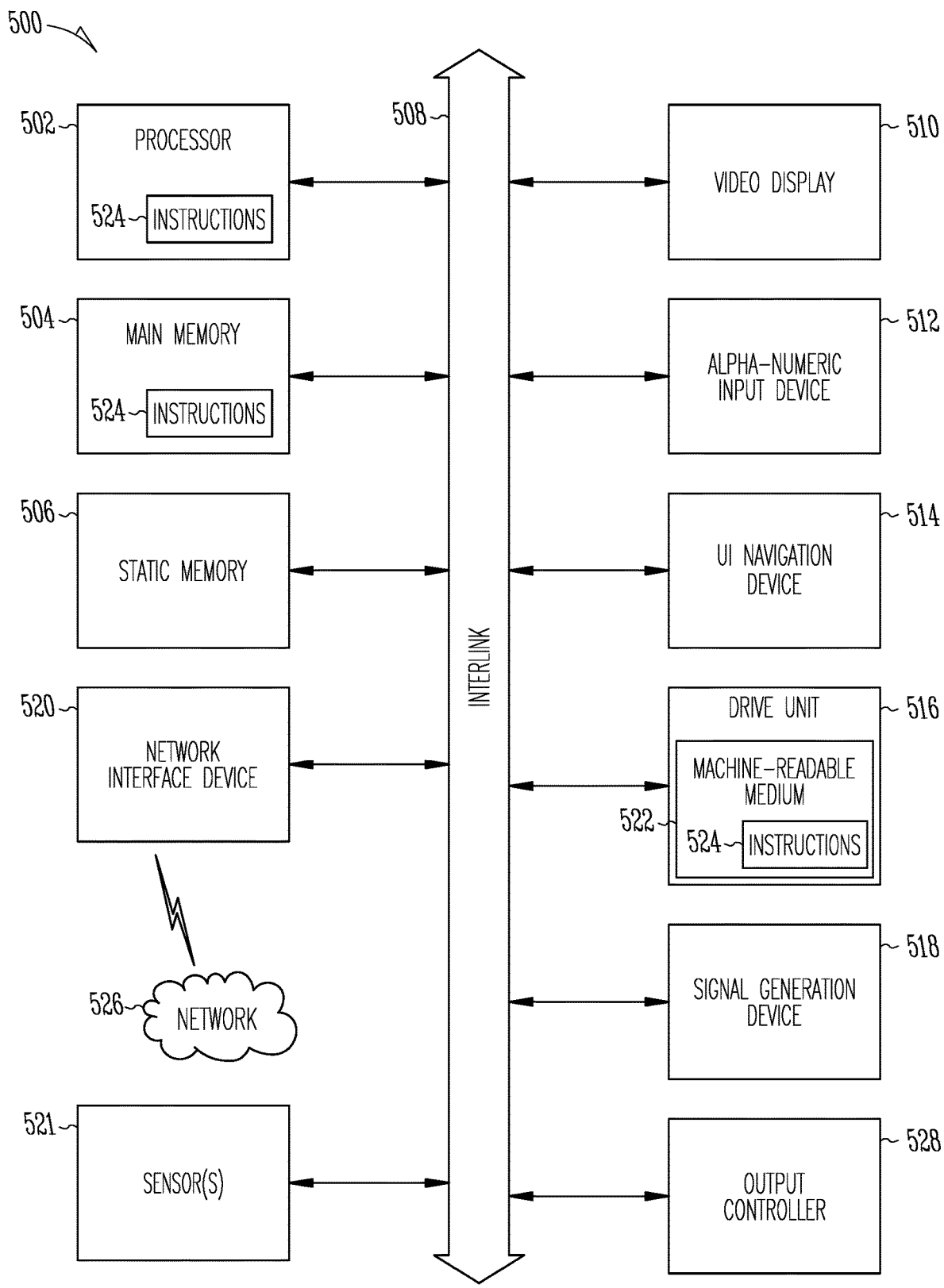
FIG. 5 is a block diagram of a machine in the example form of a computer system within which a set of instructions may be executed, for causing the machine to perform any one or more of the methodologies discussed herein.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may implement one or more of the training and prediction modules 310, 320 (e.g., as software or dedicated hardware) and may be configured to perform the method of FIG. 1. The machine 500 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a computer-implemented method including: providing, by a processor of a computer, an interactive interface for a user on a graphical user interface (GUI) of a local user device, wherein providing the interactive interface includes using an instance of a program that is prevented from accessing networks once running to ensure security of user input, receiving, by the processor, input from the user generated by user manipulation of a plurality of sliders on the interactive interface, calculating, by the processor in response to the input, a plurality of financial measures indicative of a financial health of the user based on the input, displaying, by the processor, the plurality of financial measures on the interactive interface, adjusting, by the processor in response to the input, a plurality of vertical stacked line graphs based on the input, and displaying, by the processor, the adjusted plurality of vertical stacked line graphs on the interactive interface.

In Example 2, the subject matter of Example 1 optionally further includes receiving, by the processor, additional input from the user generated by text entry into a plurality of boxes on the interactive interface, wherein each of the plurality of boxes corresponds to respective ones of the plurality of sliders.

In Example 3, the subject matter of Example 2 optionally includes wherein the additional input from the user generated by text entry into the plurality of boxes overrides the input from the user generated by user manipulation of the plurality of sliders on the interactive interface.

In Example 4, the subject matter of Example 2 optionally includes wherein the input from the user generated by user manipulation of the plurality of sliders overrides the additional input from the user generated by text entry into the plurality of boxes on the interactive interface.

In Example 5, the subject matter of Example 1 optionally includes wherein each of the plurality of financial measures includes a title portion and a numerical portion, and wherein, in response to the user hovering a pointer over the title portion, the processor is configured to display a text box describing how each of the plurality of financial measures is calculated.

In Example 6, the subject matter of Example 1 optionally further includes providing, by the processor, a heading icon on the interactive interface, and in response to the user hovering a pointer over the heading icon, displaying, by the processor, a text box describing how to use the interactive interface.

In Example 7, the subject matter of Example 1 optionally includes wherein the plurality of financial measures includes two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level.

In Example 8, the subject matter of Example 1 optionally includes wherein the interactive interface includes a monthly income section, a monthly expenses section, an assets section, a liabilities section, and a financial measures section.

In Example 9, the subject matter of Example 1 optionally includes wherein the plurality of vertical stacked line graphs includes an income and expenses vertical stacked line graph and an assets and liabilities vertical stacked line graph.

Example 10 is a system including: a computing device comprising a processor and a data storage device in communication with the processor, wherein the data storage device comprises instructions thereon that, when executed by the processor, causes the processor to: provide an interactive interface for a user on a graphical user interface (GUI) of a local user device, wherein providing the interactive interface includes using an instance of a program that is prevented from accessing networks once running to ensure security of user input; receive input from the user generated by user manipulation of a plurality of sliders on the interactive interface; calculate, in response to the input, a plurality of financial measures indicative of a financial health of the user based on the input; display the plurality of financial measures on the interactive interface; adjust, in response to the input, a plurality of vertical stacked line graphs based on the input; and display the adjusted plurality of vertical stacked line graphs on the interactive interface, wherein at least one of the plurality of vertical stacked line graphs includes a break-even line.

In Example 11, the subject matter of Example 10 optionally includes wherein the local user device includes one or more of a laptop computer, a personal computer, a tablet, or a smart phone.

In Example 12, the subject matter of Example 10 optionally includes wherein the plurality of vertical stacked line graphs includes an income and expenses vertical stacked line graph and an assets and liabilities vertical stacked line graph.

In Example 13, the subject matter of Example 10 optionally includes wherein the plurality of financial measures includes two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level.

In Example 14, the subject matter of Example 10 optionally includes wherein the data storage device comprises instructions thereon that, when executed by the processor, further causes the processor to: receive additional input from the user generated by text entry into a plurality of boxes on the interactive interface, wherein each of the plurality of boxes corresponds to respective ones of the plurality of sliders.

In Example 15, the subject matter of Example 14 optionally includes wherein the additional input from the user generated by text entry into the plurality of boxes overrides the input from the user generated by user manipulation of the plurality of sliders on the interactive interface.

In Example 16, the subject matter of Example 14 optionally includes wherein the input from the user generated by user manipulation of the plurality of sliders overrides the additional input from the user generated by text entry into the plurality of boxes on the interactive interface.

Example 17 is a non-transitory computer-readable storage medium, the computer-readable storage medium including instructions that, when executed by computers, cause the computers to perform operations of: providing an interactive interface for a user on a graphical user interface (GUI) of a local user device, wherein providing the interactive interface includes using an instance of a program that is prevented from accessing networks once running to ensure security of user input; receiving input from the user generated by user manipulation of a plurality of sliders on the interactive interface; calculating, in response to the input, a plurality of financial measures indicative of a financial health of the user based on the input; displaying the plurality of financial measures on the interactive interface; adjusting, in response to the input, a plurality of vertical stacked line graphs based on the input; and displaying the adjusted plurality of vertical stacked line graphs on the interactive interface, wherein at least one of the plurality of vertical stacked line graphs includes a break-even line.

In Example 18, the subject matter of Example 17 optionally includes wherein each of the plurality of financial measures includes a title portion and a numerical portion, and wherein, in response to the user hovering a pointer over the title portion, the computers are configured to display a text box describing how each of the plurality of financial measures is calculated.

In Example 19, the subject matter of Example 17 optionally includes wherein the medium further includes instructions that, when executed by computers, cause the computers to perform operations of: providing a heading icon on the interactive interface; and in response to the user hovering a pointer over the heading icon, displaying a text box describing how to use the interactive interface.

In Example 20, the subject matter of Example 17 optionally includes wherein the interactive interface includes a monthly income section, a monthly expenses section, an assets section, a liabilities section, and a financial measures section.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
providing, by a processor of a computer, an interactive interface for a user on a graphical user interface (GUI) of a local user device, wherein providing the interactive interface includes using an instance of a program for generating the interactive interface that is prevented by the program from accessing networks once running to ensure security of user input;
receiving, by the processor, input from the user generated by user manipulation of a plurality of sliders on the interactive interface;
calculating, by the processor in response to the input, a plurality of financial measures indicative of a financial health of the user based on the input;
displaying, by the processor, the plurality of financial measures on the interactive interface;
adjusting, by the processor in response to the input, a plurality of vertical stacked line graphs based on the input; and
displaying, by the processor, the adjusted plurality of vertical stacked line graphs on the interactive interface.

2. The method of claim 1, further comprising:
receiving, by the processor, additional input from the user generated by text entry into a plurality of boxes on the interactive interface, wherein each of the plurality of boxes corresponds to respective ones of the plurality of sliders.

3. The method of claim 2, wherein the additional input from the user generated by text entry into the plurality of boxes overrides the input from the user generated by user manipulation of the plurality of sliders on the interactive interface.

4. The method of claim 2, wherein the input from the user generated by user manipulation of the plurality of sliders overrides the additional input from the user generated by text entry into the plurality of boxes on the interactive interface.

5. The method of claim 1, wherein each of the plurality of financial measures includes a title portion and a numerical portion, and wherein, in response to the user hovering a pointer over the title portion, the processor is configured to display a text box describing how each of the plurality of financial measures is calculated.

6. The method of claim 1, further comprising:
providing, by the processor, a heading icon on the interactive interface; and
in response to the user hovering a pointer over the heading icon, displaying, by the processor, a text box describing how to use the interactive interface.

7. The method of claim 1, wherein the plurality of financial measures includes two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level.

8. The method of claim 1, wherein the interactive interface includes a monthly income section, a monthly expenses section, an assets section, a liabilities section, and a financial measures section.

9. The method of claim 1, wherein the plurality of vertical stacked line graphs includes an income and expenses vertical stacked line graph and an assets and liabilities vertical stacked line graph.

10. A system comprising:
a computing device comprising a processor and a data storage device in communication with the processor, wherein the data storage device comprises instructions thereon that, when executed by the processor, causes the processor to:
provide an interactive interface for a user on a graphical user interface (GUI) of a local user device, wherein providing the interactive interface includes using an instance of a program for generating the interactive interface that is prevented by the program from accessing networks once running to ensure security of user input;
receive input from the user generated by user manipulation of a plurality of sliders on the interactive interface;
calculate, in response to the input, a plurality of financial measures indicative of a financial health of the user based on the input;
display the plurality of financial measures on the interactive interface;
adjust, in response to the input, a plurality of vertical stacked line graphs based on the input; and
display the adjusted plurality of vertical stacked line graphs on the interactive interface, wherein at least one of the plurality of vertical stacked line graphs includes a break-even line.

11. The system of claim 10, wherein the local user device includes one or more of a laptop computer, a personal computer, a tablet, or a smart phone.

12. The system of claim 10, wherein the plurality of vertical stacked line graphs includes an income and expenses vertical stacked line graph and an assets and liabilities vertical stacked line graph.

13. The system of claim 10, wherein the plurality of financial measures includes two or more of net worth, target net worth, liquidity, surplus income, target emergency fund, current short-term assets to liabilities ratio, debt to asset ratio, debt to income ratio, debt to disposable income ratio, solvency level, savings ratio, investments to assets ratio, 50-20-30 budget ratio, target mortgage, total debt service, life insurance target coverage level, stock investment ratio, or retirement savings target level.

14. The system of claim 10, wherein the data storage device comprises instructions thereon that, when executed by the processor, further causes the processor to:
receive additional input from the user generated by text entry into a plurality of boxes on the interactive interface, wherein each of the plurality of boxes corresponds to respective ones of the plurality of sliders.

15. The system of claim 14, wherein the additional input from the user generated by text entry into the plurality of boxes overrides the input from the user generated by user manipulation of the plurality of sliders on the interactive interface.

16. The system of claim 14, wherein the input from the user generated by user manipulation of the plurality of sliders overrides the additional input from the user generated by text entry into the plurality of boxes on the interactive interface.

17. The method of claim 1, wherein the instance of the program for generating the interactive interface is prevented by the program from accessing networks by executing only on the local user device.

18. The method of claim 1, wherein the instance of the program for generating the interactive interface is prevented by the program from accessing networks by using only local data.

19. The method of claim 1, wherein the instance of the program for generating the interactive interface is prevented by the program from accessing networks by only permitting local saving of input data.

20. The method of claim 1, wherein the instance of the program for generating the interactive interface is prevented by the program from accessing networks by preventing viewing of data by remote access.

21. A non-transitory computer-readable storage medium, the computer-readable storage medium including instructions that, when executed by computers, cause the computers to perform operations of:
  providing an interactive interface for a user on a graphical user interface (GUI) of a local user device, wherein providing the interactive interface includes using an instance of a program for generating the interactive interface that is prevented by the program from accessing networks once running to ensure security of user input;
  receiving input from the user generated by user manipulation of a plurality of sliders on the interactive interface;
  calculating, in response to the input, a plurality of financial measures indicative of a financial health of the user based on the input;
  displaying the plurality of financial measures on the interactive interface;
  adjusting, in response to the input, a plurality of vertical stacked line graphs based on the input; and
  displaying the adjusted plurality of vertical stacked line graphs on the interactive interface, wherein at least one of the plurality of vertical stacked line graphs includes a break-even line.

22. The non-transitory computer-readable storage medium of claim 21, wherein each of the plurality of financial measures includes a title portion and a numerical portion, and wherein, in response to the user hovering a pointer over the title portion, the computers are configured to display a text box describing how each of the plurality of financial measures is calculated.

23. The non-transitory computer-readable storage medium of claim 21, wherein the medium further includes instructions that, when executed by computers, cause the computers to perform operations of:
  providing a heading icon on the interactive interface; and
  in response to the user hovering a pointer over the heading icon, displaying a text box describing how to use the interactive interface.

24. The non-transitory computer-readable storage medium of claim 21, wherein the interactive interface includes a monthly income section, a monthly expenses section, an assets section, a liabilities section, and a financial measures section.

* * * * *